(12) United States Patent
Scheid

(10) Patent No.: US 7,669,463 B2
(45) Date of Patent: Mar. 2, 2010

(54) DETERMINING THE FUEL CONSUMPTION OF AN INTERNAL COMBUSTION ENGINE

(75) Inventor: Ing Ernst Scheid, Aachen (DE)

(73) Assignee: Fev Motorentechnik GmbH, Aachen (DE)

( * ) Notice: Subject to any disclaimer, the term of this patent is extended or adjusted under 35 U.S.C. 154(b) by 267 days.

(21) Appl. No.: 11/832,115

(22) Filed: Aug. 1, 2007

(65) Prior Publication Data
US 2008/0156082 A1   Jul. 3, 2008

(30) Foreign Application Priority Data
Aug. 3, 2006   (DE) .................. 10 2006 036 666

(51) Int. Cl.
*G01M 15/05* (2006.01)
(52) U.S. Cl. .................................. 73/114.52
(58) Field of Classification Search ............. 73/114.52, 73/114.53, 114.54
See application file for complete search history.

(56) References Cited

U.S. PATENT DOCUMENTS

| | | |
|---|---|---|
| 3,772,915 A | 11/1973 | Stamler |
| 3,973,536 A | 8/1976 | Zelders |
| 4,134,301 A | 1/1979 | Erwin, Jr. |
| 4,612,804 A | 9/1986 | Colonnello |
| 6,038,917 A * | 3/2000 | Sember .................. 73/114.53 |

FOREIGN PATENT DOCUMENTS

| | | |
|---|---|---|
| EP | 1437578 A1 | 7/2004 |
| JP | 08042376 | 2/1996 |
| JP | 8042376 | 2/1996 |
| JP | 09060542 | 3/1997 |
| JP | 9060542 | 3/1997 |
| JP | 2004190545 | 7/2004 |

\* cited by examiner

*Primary Examiner*—Eric S McCall
(74) *Attorney, Agent, or Firm*—Gifford, Krass, Sprinkle, Anderson & Citkowski, P.C.

(57) ABSTRACT

A method of determining the fuel consumption of an internal combustion engine 12, more particularly when operated on a test rig, wherein fuel is supplied in a circuit to the internal combustion engine and discharged therefrom and wherein a quantity of fuel is supplied to the circuit 11 via a branch line 22 from a fuel tank 23 and measured in the branch line, wherein temperature-related changes in the volume of the fuel are determined in the circuit 11 and wherein the consumed quantity $\dot{m}S$ determined in the branch line 22 is corrected by a corrective quantity $\dot{m}K$ corresponding to the temperature-related changes in volume in the circuit.

8 Claims, 1 Drawing Sheet

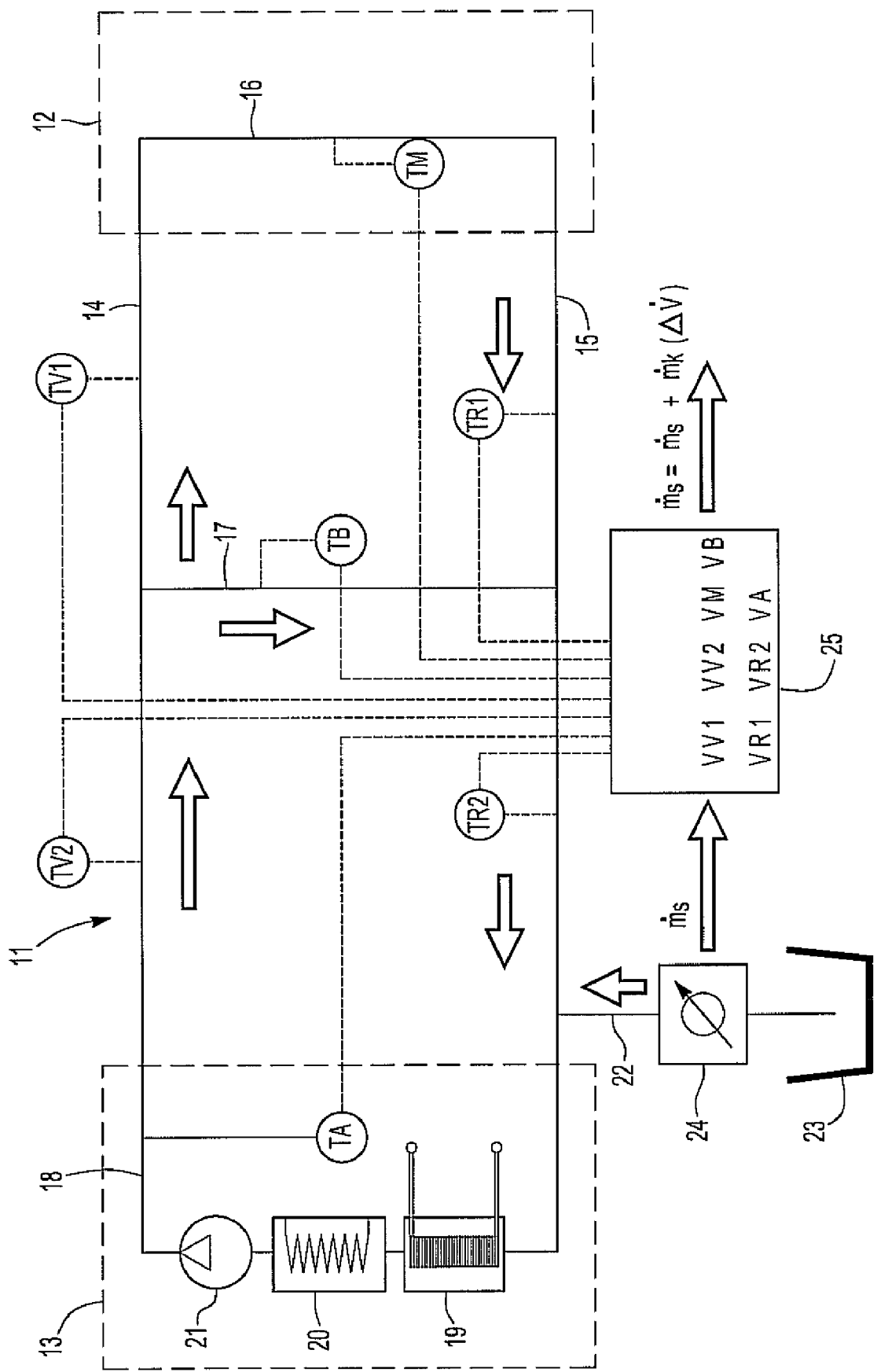

DETERMINING THE FUEL CONSUMPTION OF AN INTERNAL COMBUSTION ENGINE

CROSS-REFERENCE TO RELATED APPLICATIONS

This application claims priority of German Patent Application Serial No. 10 2006 036 666.2, filed Aug. 3, 2006, which is incorporated herein by reference.

FIELD OF THE INVENTION

The invention relates to a method of and device for determining the fuel consumption of an internal combustion engine, more particularly when operated on a test rig, comprising a closed circuit for the fuel into which the internal combustion engine is incorporated as a consumer, a fuel tank and a branch line extending from the fuel tank to the circuit, as well as a through-flow quantity measuring device in the branch line for measuring the consumption.

BACKGROUND OF THE INVENTION

Current, accurate fuel consumption measurements are extremely important for modern test rigs for internal combustion engines. It is a fact that fuel consumption is adversely affected by temperature fluctuations in the fuel circuit. Such temperature fluctuations are primarily due to changes in temperature of the internal combustion engine when in stationary operation, whereas the measured results taken during a stationary operation are reliable. Such changes in temperature can hardly be avoided although in the forward line of the fuel circuit there are provided devices for conditioning the fuel temperature, more particularly a cooler as well as a heater. The time-related changes in temperature lead to changes in the density of the fuel and thus changes in the fuel volume in the circuit while the volume of the line system remains constant. The fuel quantity which is supplied from a tank and which is recorded at a consumption measuring point in a supply line is reduced if there occurs a temporary increase in temperature due to an increase in the volume of the fuel in the system, whereas if there occurs a reduction in temperature and thus a reduction in volume, an increased quantity has to be supplied through the consumption measuring point, compared to the actual quantity consumed by the internal combustion engine.

SUMMARY OF THE INVENTION

It is an object of the present invention to ensure accurate fuel measurements, more particularly on test rigs for internal combustion engines, also during stationary phases of engine operation. The objective is achieved by providing a method according to which temperature-related changes in the volume of the fuel in the circuit are determined and according to which the quantity consumed and determined in the branch line is corrected by a corrective quantity corresponding to the temperature-related changes in volume in the circuit. According to a first embodiment, there is defined more particularly a partial volume in the fuel return line between the internal combustion engine and the branch line, with the temperature of said partial volume being recorded by at least one temperature measuring point arranged in said partial region. In a first approximation it is assumed that the temperature-related changes in volume in the forward line from the tank to the internal combustion engine and in the small fuel volume enclosed in the internal combustion engine are negligibly small.

According to an improved embodiment, the entire fuel system is divided into defined partial regions which are each provided with a temperature measuring point and for each of which a partial volume is stored in a storage and computer unit.

According to a special embodiment, it is proposed that the fuel in the circuit behind the connection of the branch line is controlled and set to a constant feed temperature.

An inventive device is characterized by at least one temperature measuring point TR1 in the circuit and by a storage and computer unit to which there is connected the exit of the through-flow quantity measuring device and the exit of the at least one temperature measuring device and the exit of the at least one temperature measuring point TR1 and in which there is stored a partial volume VR1 associated with the at least one temperature measuring point TR1 for calculating a corrective quantity ṁK corresponding to the temperature-related changes in the volume of the fuel in the circuit and for correcting the measured value ṁS of the apparent quantity consumed according to the through-flow quantity measurements at the through-flow quantity measuring device by corrective quantity ṁK corresponding to the changes in volume in the circuit. In accordance with the above-described method, it is proposed more particularly, that a plurality of temperature measuring points is provided in the circuit and that each temperature measuring point is associated with a partial volume of the circuit, whose value is stored in the storage and computer unit.

As a rule, the inventive device comprises a system for conditioning the fuel temperature, which device, more particularly, comprises a fuel cooler and a fuel heating device.

The measuring accuracy can be improved further by using an additional fuel cooler in the return line from the internal combustion engine to the tank. This measure specifically reduces the greatest source of errors, i.e. the change in the fuel temperature directly behind the internal combustion engine in the case of load changes.

BRIEF DESCRIPTION OF THE DRAWING

FIG. 1 is a schematic diagram of an embodiment of the present invention.

DETAILED DESCRIPTION OF THE PREFERRED EMBODIMENTS

The diagram of an inventive device contained in FIG. 1 will be described below. In a test rig environment there is shown the fuel circuit 11 of an internal combustion engine 12, which fuel circuit 11 forms a closed loop and is guided through the internal combustion engine 12 on the one hand and through a fuel temperature conditioning unit 13 on the other hand. Furthermore, the circuit is shown to comprise a forward branch line 14, a return branch line 15, an engine through-passage 16, a bypass line 17 parallel to the engine through-passage as well as a conditioning portion 18 in the region of the unit 13. As far as details are concerned, the conditioning unit 13 comprises a heater 19, a cooler 20 and a circulation pump 21. The fuel quantity held in circulation by the circulation pump is continuously replenished by the fuel quantity consumed in the engine through-passage 16, via a branch line 22 which is connected to the fuel tank 23 and connects same to the circuit 11. In the branch line 22 there is provided a consumption measuring point 24 which records an apparent consumption ṁS which corresponds to the quantity actually supplied to the circuit 11 via the branch line 22. As a result of temperature changes of the stationary type, more particularly in the region of the engine through-passage 16 in the case of load increases or load reductions of the internal combustion engine, there takes place a change in the density of the fuel, so that if the temperature is increased in the engine through-passage 16 and in the return line 15, an increased volume flow returns, thus falsely pretending that the fuel consumption of the internal combustion engine 12 is lower, whereas if the temperature in the engine through-passage 16 and in the return line 15 is reduced, the returning volume flow is reduced, thus pretending that there exists an increased fuel consumption as compared to the true fuel consumption of the internal combustion engine. To determine the true fuel consumption $\dot{m}$ the apparent fuel consumption $\dot{m}S$ measured in the consumption measuring point 24 has to be corrected by a corrective consumption $\dot{m}K$, which is obtained as a function of the differential volume flow $\delta \dot{V}$ which, as a function of the temperature, when the temperature is increased in the fuel, is quasi pressed from the circuit 11 into the branch line 22, i.e. it actually appears as a reduced consumption at the consumption measuring point 24, and if the temperature is reduced in the fuel, is additionally drawn into the circuit 11 via the branch line 22 additionally to the true engine consumption and thus appears as an additional consumption at the consumption measuring point 24. The partial volume values of the circuit are stored in a storage and computer unit 25, at least for the return line 15 between the engine exit and the branch line 22. There are provided temperature measuring points at the return line (TR1, TR2), at the forward line (TV1, TV2), in the engine (TM), in the bypass line (TB) and in the temperature conditioning unit (TA) which are associated with the partial volumes. Via time-related temperature changes $\delta \dot{T}$ of the individual partial volumes, the temperature coefficient $\alpha$ can be used to calculate time-related changes in volume $\delta \dot{V} = \delta \dot{T} \times \alpha \times V$, and by means of the time-related changes in volume with the density $\rho$, there is obtained the corrected consumption $\dot{m}K = \delta \dot{V} \times \rho$.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A method of determining a fuel consumption of an internal combustion engine, wherein fuel is supplied in a circuit to the internal combustion engine and discharged therefrom and wherein a quantity of fuel is supplied to the circuit via a branch line from a fuel tank and measured in the branch line, said method comprising the steps of:

determining an apparently consumed quantity of fuel in the branch line;

determining temperature-related changes in a volume of fuel within the circuit by:

measuring the temperature of the fuel at a plurality of measuring points in the circuit;

assigning to each measuring point a partial volume of the circuit;

determining the partial volume change of the partial volumes as a function of temperature change in time at the measuring points;

adding the partial volume changes in order to determine a total volume change; and calculating a corrective consumption value as a function of the total volume change; and correcting the apparently consumed quantity of fuel determined in the branch line by the temperature-related changes in the volume of the fuel within the circuit, so as to determine a consumed quantity of fuel.

2. A method according to claim 1, including measuring a temperature at least in a return line within the circuit between the internal combustion engine and the branch line, the measured temperature being associated with a corresponding partial volume in the return line.

3. A method according to claim 1, including controlling the temperature of the fuel past the connection of the branch line to the circuit in order to achieve a constant feed temperature.

4. A device for determining a fuel consumption of an internal combustion engine, said device comprising:

a closed circuit for fuel, said closed circuit including the internal combustion engine in the form of a consumer;

a fuel tank and a branch line extending from said fuel tank to said closed circuit;

a through-flow quantity measuring device in said branch line for measuring the apparent fuel consumption;

at least one temperature measuring point in said closed circuit;

a storage and computer unit to which there is connected an exit of said through-flow measuring device and an exit of said at least one temperature measuring point;

said storage and computer unit operable to store a partial volume of said closed circuit assigned to said at least one temperature measuring point, calculate a corrective quantity corresponding to temperature-related changes in volume of the fuel in said closed circuit, and correct a measured value of an apparent quantity of consumption measured by said through-flow quantity measuring device by said corrective quantity corresponding to said temperature-related changes in volume in said closed circuit.

5. A device according to claim 4 wherein a plurality of temperature measuring points in said closed circuit each are assigned a partial volume of the circuit, said partial volume values stored in said storage and computer unit.

6. A device according to claim 4, wherein a first fuel cooler is arranged in said closed circuit past an entrance of said branch line into said closed circuit.

7. A device according to claim 6 wherein a fuel heater is arranged in said closed circuit past said entrance of said branch line into said closed circuit.

8. A device according to claim 6, wherein a second fuel cooler is arranged in said closed circuit between the internal combustion engine and said entrance of said branch line into said closed circuit.

* * * * *

UNITED STATES PATENT AND TRADEMARK OFFICE
CERTIFICATE OF CORRECTION

| | | |
|---|---|---|
| PATENT NO. | : 7,669,463 B2 | Page 1 of 1 |
| APPLICATION NO. | : 11/832115 | |
| DATED | : March 2, 2010 | |
| INVENTOR(S) | : Ing Ernst Scheid | |

It is certified that error appears in the above-identified patent and that said Letters Patent is hereby corrected as shown below:

On the Title page item (73), should read:

Assignee: FEV MOTORENTECHNIK GMBH

Signed and Sealed this
Eleventh Day of January, 2011

David J. Kappos
*Director of the United States Patent and Trademark Office*